United States Patent
Tsai et al.

(10) Patent No.: US 8,676,561 B2
(45) Date of Patent: Mar. 18, 2014

(54) ANALYSIS METHOD FOR TURBINE-GENERATOR TORSIONAL VIBRATIONS AFFECTED BY POWER TRANSMISSION SYSTEM

(75) Inventors: Jong-Ian Tsai, Kaohsiung (TW);
Ching-Tai Chiang, Kaohsiung (TW);
Rong-Ching Wu, Kaohsiung (TW);
Chen-Sen Ouyang, Kaohsiung (TW)

(73) Assignee: I-Shou University, Kaohsiung (TW)

( * ) Notice: Subject to any disclaimer, the term of this patent is extended or adjusted under 35 U.S.C. 154(b) by 227 days.

(21) Appl. No.: 13/188,095

(22) Filed: Jul. 21, 2011

(65) Prior Publication Data
US 2012/0303350 A1 Nov. 29, 2012

(30) Foreign Application Priority Data

May 23, 2011 (TW) ............................... 100118023 A

(51) Int. Cl.
*G06F 17/50* (2006.01)
(52) U.S. Cl.
USPC .......................................................... 703/18
(58) Field of Classification Search
None
See application file for complete search history.

(56) References Cited

U.S. PATENT DOCUMENTS

| | | | |
|---|---|---|---|
| 4,014,599 A | 3/1977 | Bogdanov et al. | |
| 5,126,641 A | 6/1992 | Putman et al. | |
| 8,004,252 B2 * | 8/2011 | Sihler et al. | 322/58 |

OTHER PUBLICATIONS

Jong-Ian Tsai; Rong-Ching Wu; Tung-Sheng Zhan; Ting-Chia Ou; Wen-Yang Li; Yong-Nong Chang, "Turbine-generator blade and shaft torisonal torques due to line faults in six-phase transmission systems evolved from three-phase double-circuit line systems," Industrial Electronics and Applications. ICIEA 2009. 4th IEEE Conference, pp. 2961-2965 May 2009.*
Liu, G. Y.; Yang, Y.H., "Study of four-phase power transmission systems," Generation, Transmission and Distribution, IEE Proceedings- , vol. 149, No. 4, pp. 397,401, Jul. 2002.*
Liu Guangye; Yang Yihan, "Three-phase-to-four-phase transformer for four-phase power-transmission systems," Power Delivery, IEEE Transactions on , vol. 17, No. 4, pp. 1018,1022, Oct. 2002.*
Chen, T.-H.; Kuo, H.-Y., "Network modelling of traction substation transformers for studying unbalance effects," Generation, Transmission and Distribution, IEE Proceedings- , vol. 142, No. 2, pp. 103,108, Mar. 1995.*
Mazzanti, G.; Quaia, S., "Four-Phase AC Connections: An Alternative Possibility for the Expansion of Transmission Grids," Power Delivery, IEEE Transactions on , vol. 25, No. 2, pp. 1010,1018, Apr. 2010.*
Zhang Zhi-Wen. Three-phase to Four-phase or Two-phase Balance Transformer Connected in Y and Double Trapezoids, Proceedings of the CSEE, 2007, 27(3):78-82 (Pubitemid 46575838).*

* cited by examiner

*Primary Examiner* — Omar Fernandez Rivas
*Assistant Examiner* — Robert Brock
(74) *Attorney, Agent, or Firm* — Muncy, Geissler, Olds & Lowe, P.C.

(57) ABSTRACT

An analysis method for turbine-generator torsional vibrations affected by power transmission system, which is processed by a computer system with a simulation software, is proposed. This analysis method comprises: building structures of a first system model and a second system model to respectively simulate a first system and a second system; building detailed models of the first and second system model; and analyzing the detailed models of the first and second system model in frequency- and time-domain.

7 Claims, 9 Drawing Sheets

ANALYSIS METHOD FOR TURBINE-GENERATOR TORSIONAL VIBRATIONS AFFECTED BY POWER TRANSMISSION SYSTEM

BACKGROUND OF THE INVENTION

1. Field of the Invention

The present invention generally relates to an analysis method for turbine-generator torsional vibrations and, more particularly, to an analysis method for turbine-generator torsional vibrations due to power transmission system.

2. Description of the Related Art

Presently, the power transmission structure of Taiwan is mainly distributed at the west coast of Taiwan like a narrow belt, which is briefly divided into "North part," "Center part" and "South part" connected by transmission lines with a high voltage level of 345 kV, and a sketch of the pylon, arrangement of conductors and voltage-time diagram of the used three-phase power transmission system are shown in FIGS. 1a, 1b and 1c. Owing to the increasing population of the west coast, it is hard to obtain sufficient and suitable lands for pylons and substations for any new transmission line. On the other hand, power transmission for transmitting electrical power from the "South part" and "Center part" to the "North part" is truly important for the Taiwan power transmission structure since the population of the north part in Taiwan is much higher than those of the other parts. However, the above fact results in a high loading of the power transmission lines, a large rotor angle difference between north and south parts of Taiwan power plants, and worse stability of power supply. Therefore, how to increase the capacity of a power transmission system has become an important issue in this field.

Please refer to FIGS. 2a, 2b and 2c, which are a sketch of the pylons, arrangement of conductors and voltage-time diagram of a four-phase power transmission system. Adjusting the used three-phase power transmission system to a four-phase power transmission system may actually improve the capacity of power transmission lines because a four-phase power transmission system has properties such as high transient stability, low interference induced by electromagnetic filed, and reduced conductor arrangement in space. Besides, the four-phase power transmission system is a power transmission system with even number of phases and similar to the conventional three-phase power transmission system. Therefore, the four-phase power transmission system may be an acceptable solution for the situation in Taiwan.

However, most of the studies of a four-phase power transmission system are focused on transformation technique, differential protection from a three-phase power transmission system to a four-phase power transmission system, and economic analysis, and none of them is about interaction effects on connected turbine-generator and four-phase power transmission system.

Moreover, in order to acquire a low cost in power generation and high thermal efficiency, the scales of power generators are gradually increased because nuclear power generations were introduced to Taiwan. However, once the scales of power generators are increased, transient fault accident of the power transmission system can easily result in torsional vibrations of fan wheel and rotor shaft of the turbine-generator and lead to fatigue life expenditure problems on the fan wheel and rotor shaft.

Accordingly, it is necessary to analyze the affection of torsional vibrations to the turbine-generator caused by transient fault of the power transmission system prior to actually applying the four-phase power transmission system to the power transmission structure of Taiwan. Thus, an analysis method for turbine-generator torsional vibrations affected by power transmission system is required to examine the feasibility and effectiveness of a four-phase power transmission system.

SUMMARY OF THE INVENTION

It is therefore the primary objective of this invention to provide an analysis method for turbine-generator torsional vibrations affected by power transmission system, by which models and analyses are made for ensuring the feasibility and effectiveness of a four-phase power transmission system.

The invention discloses an analysis method for turbine-generator torsional vibrations affected by power transmission system, which is processed by a computer system with a simulation software, comprises: building structures of a first system model and a second system model to respectively simulate a first system and a second system; building detailed models of the first and second system model; and analyzing the detailed models of the first and second system model in frequency- and time-domain.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1A:
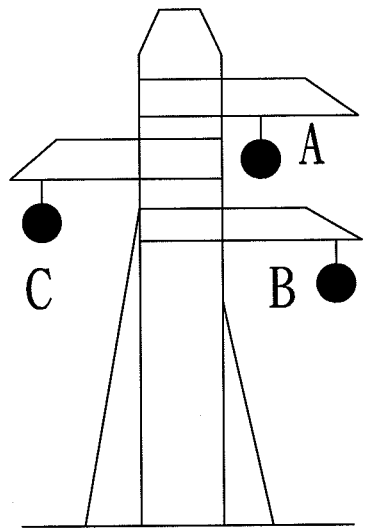
FIG. 1a shows a sketch diagram of a pylon of a conventional three-phase power transmission system.
Figure 1B:
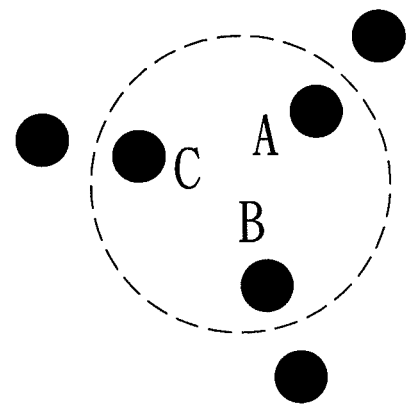
FIG. 1b shows a sketch diagram of an arrangement of conductors of a conventional three-phase power transmission system.
Figure 1C:
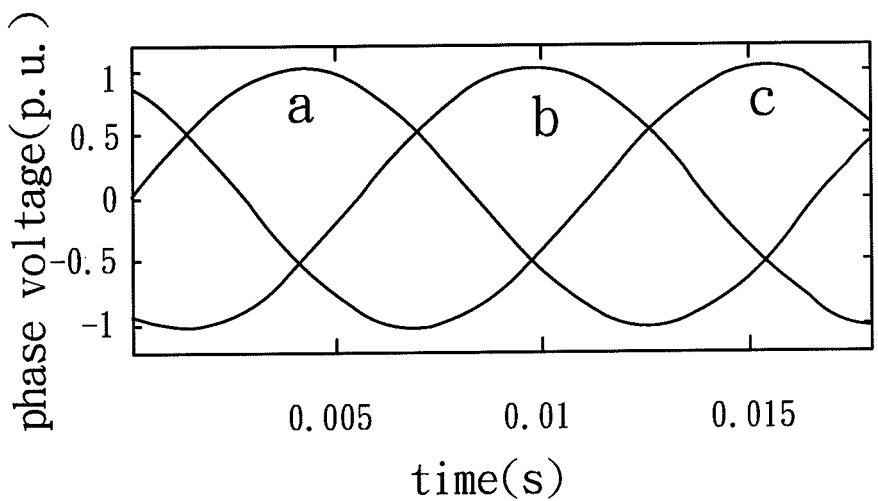
FIG. 1c shows a voltage-time diagram of a conventional three-phase power transmission system.
Figure 2A:
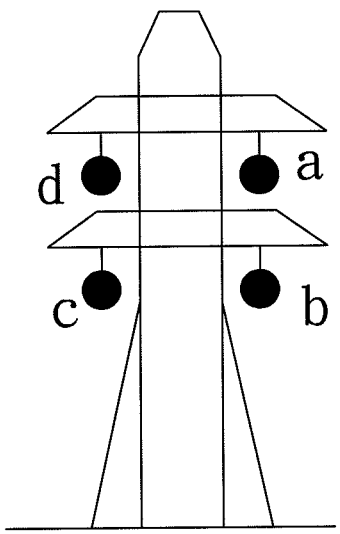
FIG. 2a shows a sketch diagram of a pylon of a conventional four-phase power transmission system.
Figure 2B:
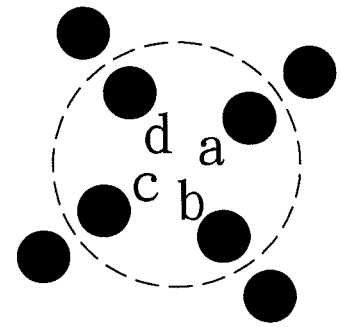
FIG. 2b shows a sketch diagram of an arrangement of conductors of a conventional four-phase power transmission system.
Figure 2C:
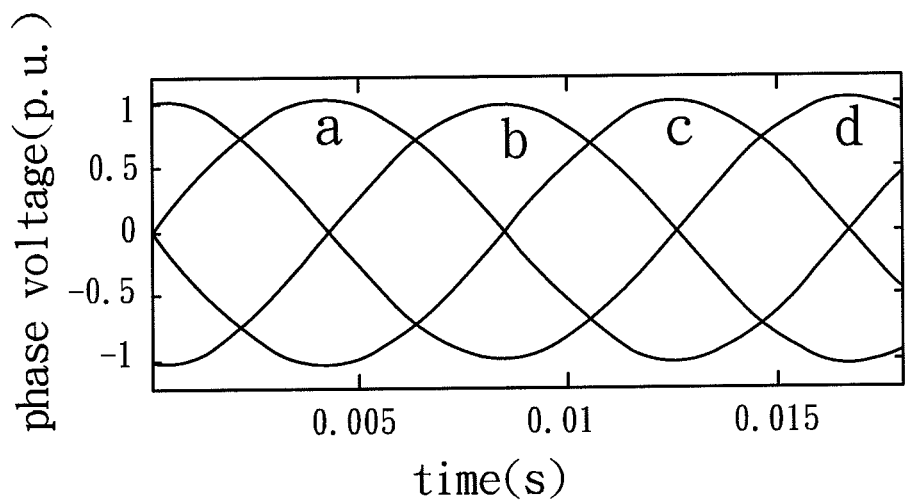
FIG. 2c shows a voltage-time diagram of a conventional four-phase power transmission system.
Figure 2D:
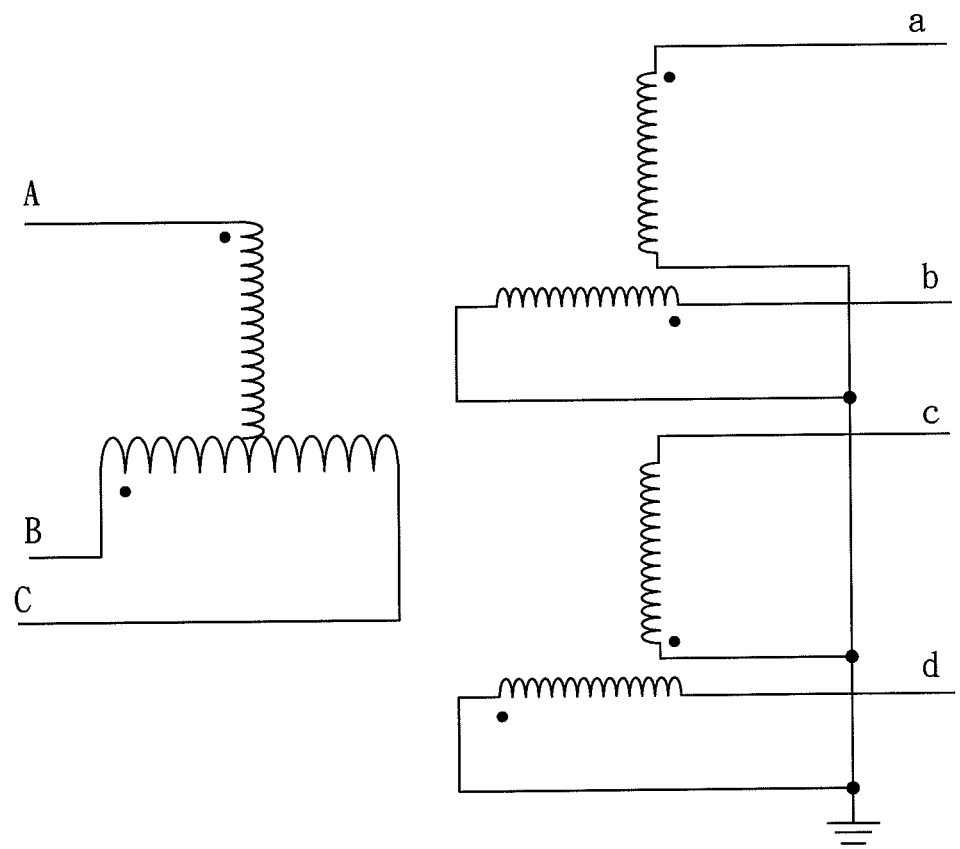
FIG. 2d shows the transformer diagram of a three-phase to four-phase conversion.

In the various figures of the drawings, the same numerals designate the same or similar parts. Furthermore, when the term "first," "second," "third", "fourth" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 3:
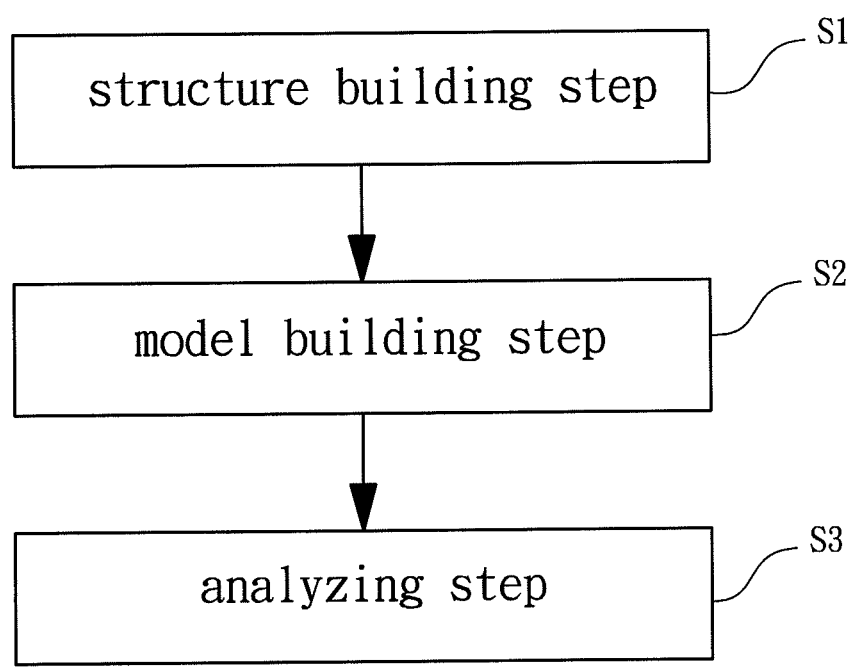
FIG. 3 shows a block diagram of an analysis method of a preferred embodiment of the invention.

Referring to FIG. 3, a block diagram illustrating a preferable embodiment of the present invention of an analysis method for turbine-generator torsional vibrations affected by power transmission system is shown, wherein the analysis method includes a structure building step S1, a model building step S2, and an analyzing step S3.

In the structure building step S1, structures of a first system model and a second system model are built to respectively simulate a first system and a second system. In this embodiment, the first system model simulates a combination of a three-phase power transmission system and a turbine-generator, and the second system model simulates a combination of a four-phase power transmission system and a turbine-generator.

Figure 4A:
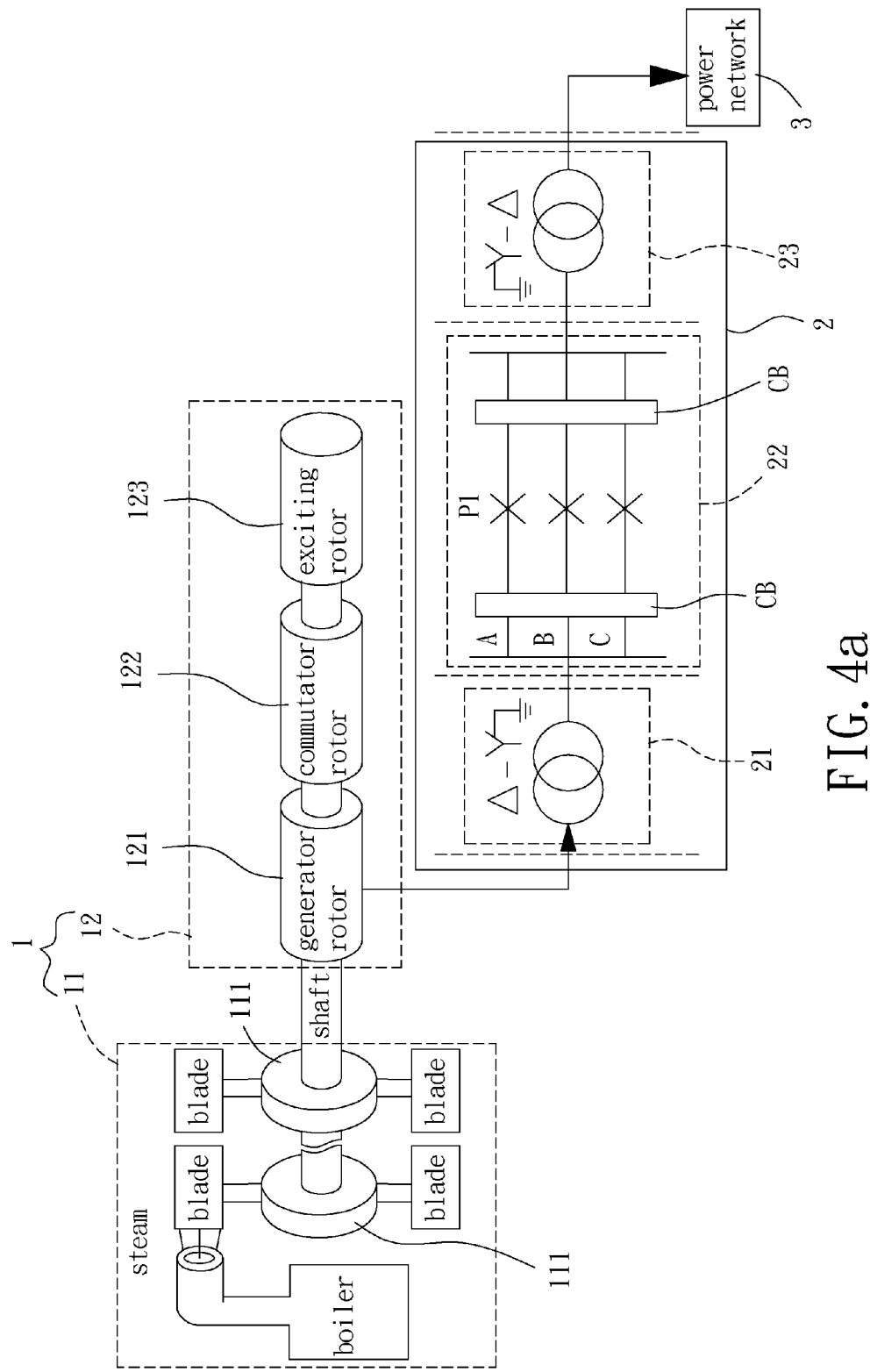
FIG. 4a shows a structure of a first system model of the analysis method of the preferred embodiment of the invention.

In detail, referring to FIG. 4a, the structure of the first system model includes a turbine-generator 1, a first power transmission system 2, and a power network 3. The turbine-generator 1 includes a turbine set 11 and a generator 12 driven by the turbine set 11; the first power transmission system 2 includes a first transformer 21, a three-phase transmission module 22, and a second transformer 23; and the power network 3 is an infinite bus system. In this embodiment, there is a plurality of turbines 111 in the turbine set 11 with each turbine 111 having a plurality of blades. The generator 12 includes a generator rotor 121, a commutator rotor 122, and an exciting rotor 123 in serial connection, with the generator rotor 121 connecting with the turbines 111 of the turbine set 11. The first transformer 21 is a Delta-Wye-Ground transformer with the capacity of 1057 MVA. The three-phase transmission module 22 is a single-circuit three-phase line system with a high voltage level of 345 kV, which includes power transmission lines "A," "B," "C" and two circuit breaks "CB." The second transformer 23 is a Wye-Ground-Delta transformer.

Figure 4B:
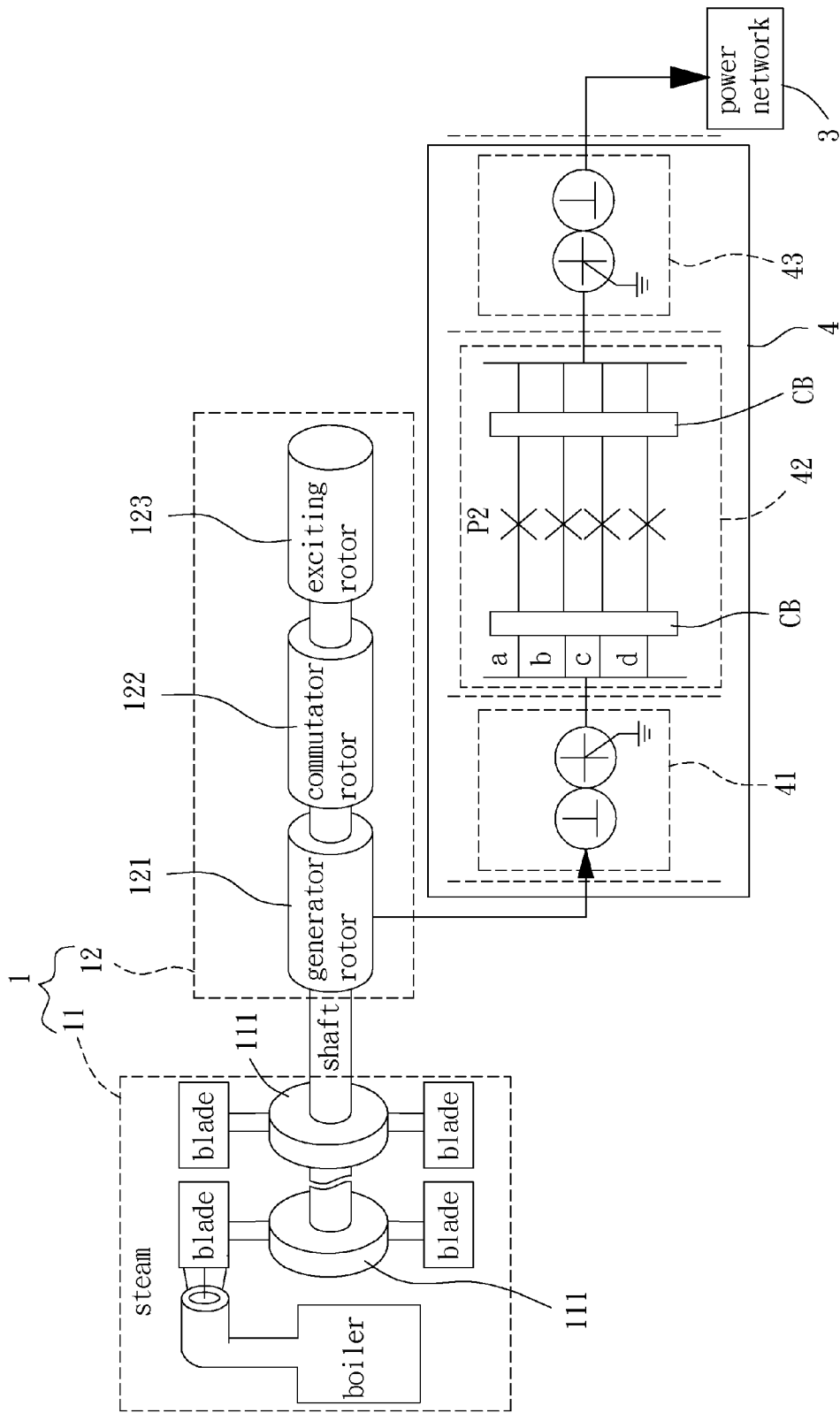
FIG. 4b shows a structure of a second system model of the analysis method of the preferred embodiment of the invention.

Referring to FIG. 4b, the difference between the structures of the first and second system models lies in that, in the second system model, the first power transmission system 2 in the first system model is substituted by a second power transmission system 4. The second power transmission system 4 includes a third transformer 41, a four-phase transmission module 42, and a fourth transformer 43, which are connected in series. The third transformer 41 is a Scott-+-Ground transformer with the capacity of 1057 MVA. The four-phase transmission module 22 is a single-circuit four-phase line system with a high voltage level of 211.3 kV, which includes power transmission lines "a," "b," "c," "d" and two circuit breaks "CB." The second transformer 23 is a +-Ground-Scott transformer.

In the second model building step S2, details of the first and second system models are built, wherein a turbine-generator mechanistic model, a fan wheel mechanistic model, a turbine-generator electric model, and a transformer model are introduced.

Figure 5:
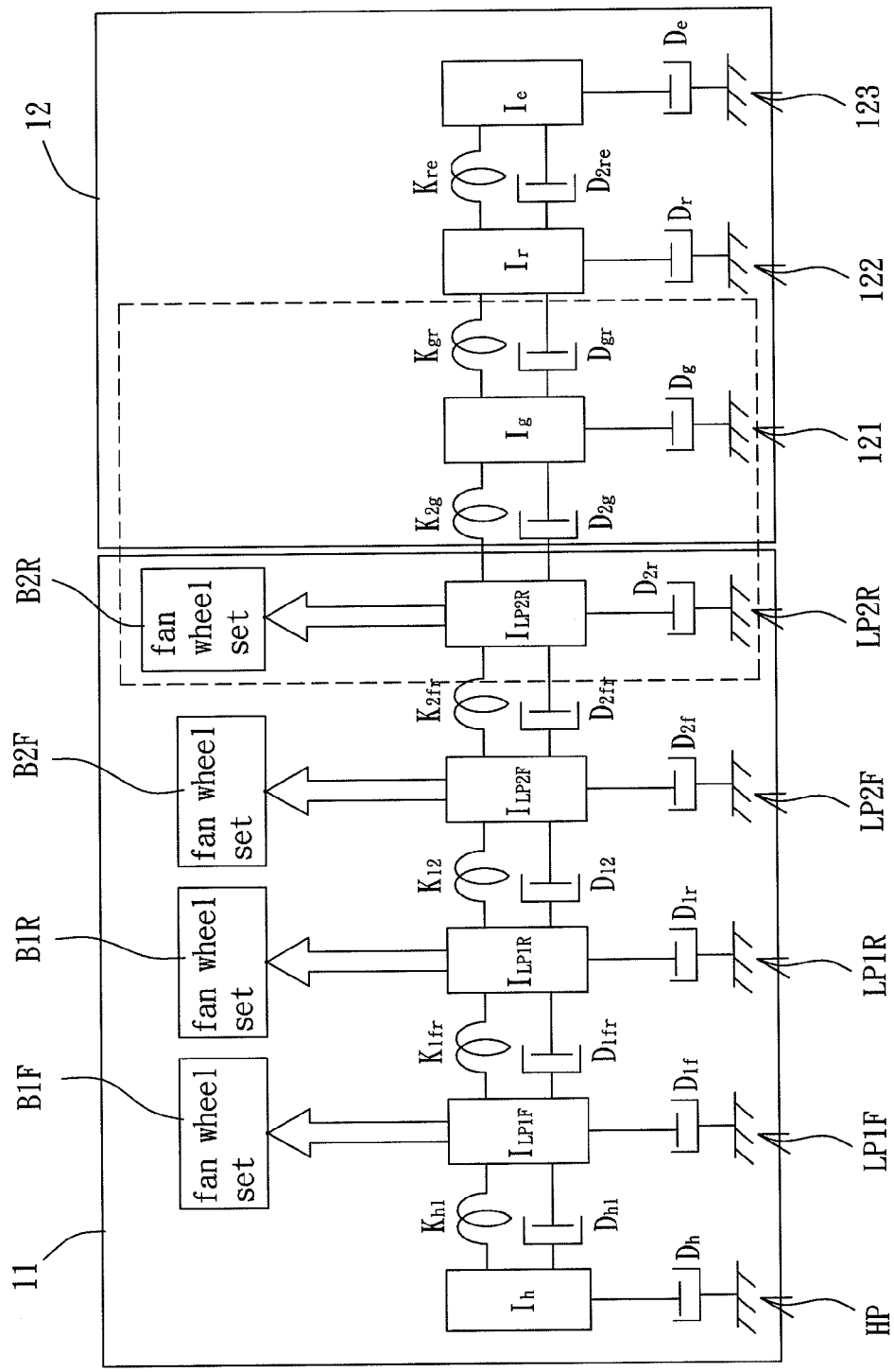
FIG. 5 shows a structure of a turbine-generator mechanistic model of the analysis method of the preferred embodiment of the invention.

Referring to FIG. 5, the turbine-generator mechanistic model is presented in a mass-damping-spring form, which includes models of the turbine set 11 and generator 12. Specifically, the plural turbines 111 of the turbine set 11 are represented by a high pressure turbine "HP," a front part of a first stage low pressure turbine "LP1F," a rear part of the first stage low pressure turbine "LP1R," a front part of a second stage low pressure turbine "LP2F," and a rear part of the second stage low pressure turbine "LP2R," with each of the front and rear parts of the first and second stage low pressure turbines "LP1F," "LP2F," "LP1R" and "LP2R" having a respective fan wheel set "B1F," "B2F," "B1R" or "B2R." Each of the fan wheel sets "B1F," "B2F," "B1R," "B2R" has 11 stages, while the prior 9 stages of each fan wheel set "B1F," "B2F," "B1R" or "B2R" are connected in series by tubular air channel.

In the models of the turbine set 11 and generator 12, mass elements "$I_h$," "$I_{LP1F}$," "$I_{LP1R}$," "$I_{LP2F}$," "$I_{LP2R}$," "$I_g$," "$I_r$," and "$I_e$" respectively represent the inertia factors of the high pressure turbine "HP," front part of the first stage low pressure turbine "LP1F," rear part of the first stage low pressure turbine "LP1R," front part of the second stage low pressure turbine "LP2F," rear part of the second stage low pressure turbine "LP2R," generator rotor 121, commutator rotor 122, and exciting rotor 123. Spring elements "$K_{h1}$," "$K_{1f}$," "$K_{12}$," "$K_{2f}$," "$K_{2g}$," "$K_{gr}$," and "$K_{re}$" respectively represent the rigidity factors between the high pressure turbine "HP" and the front part of the first stage low pressure turbine "LP1F," the front part of the first stage low pressure turbine "LP1F" and the rear part of the first stage low pressure turbine "LP1R," the rear part of the first stage low pressure turbine "LP1R" and the front part of the second stage low pressure turbine "LP2F," the front part of the second stage low pressure turbine "LP2F" and rear part of the second stage low pressure turbine "LP2R," the rear part of the second stage low pressure turbine "LP2R" and the generator rotor 121, the generator rotor 121 and the commutator rotor 122, and the commutator rotor 122 and exciting rotor 123. Damper elements "$D_h$," "$D_{1f}$," "$D_{1r}$," "$D_{2f}$," "$D_{2r}$," "$D_g$," "$D_r$," and "$D_e$" respectively represent the damping factors of the high pressure turbine "HP," front part of the first stage low pressure turbine "LP1F," rear part of the first stage low pressure turbine "LP1R," front part of the second stage low pressure turbine "LP2F," rear part of the second stage low pressure turbine "LP2R," generator rotor 121, commutator rotor 122, and exciting rotor 123. Moreover, Damper elements "$D_{h1}$," "$D_{1f}$," "$D_{12}$," "$D_{2f}$," "$D_{2g}$," "$D_{gr}$," and "$D_{re}$" respectively represent the damping factors between the high pressure turbine "HP" and the front part of the first stage low pressure turbine "LP1F," the front part of the first stage low pressure turbine "LP1F" and the rear part of the first stage low pressure turbine "LP1R," the rear part of the first stage low pressure turbine "LP1R" and the front part of the second stage low pressure turbine "LP2F," the front part of the second stage low pressure turbine "LP2F" and the rear part of the second stage low pressure turbine "LP2R," the rear part of the second stage low pressure turbine "LP2R" and the generator rotor 121, the generator rotor 121 and the commutator rotor 122, and the commutator rotor 122 and exciting rotor 123.

Figure 6:
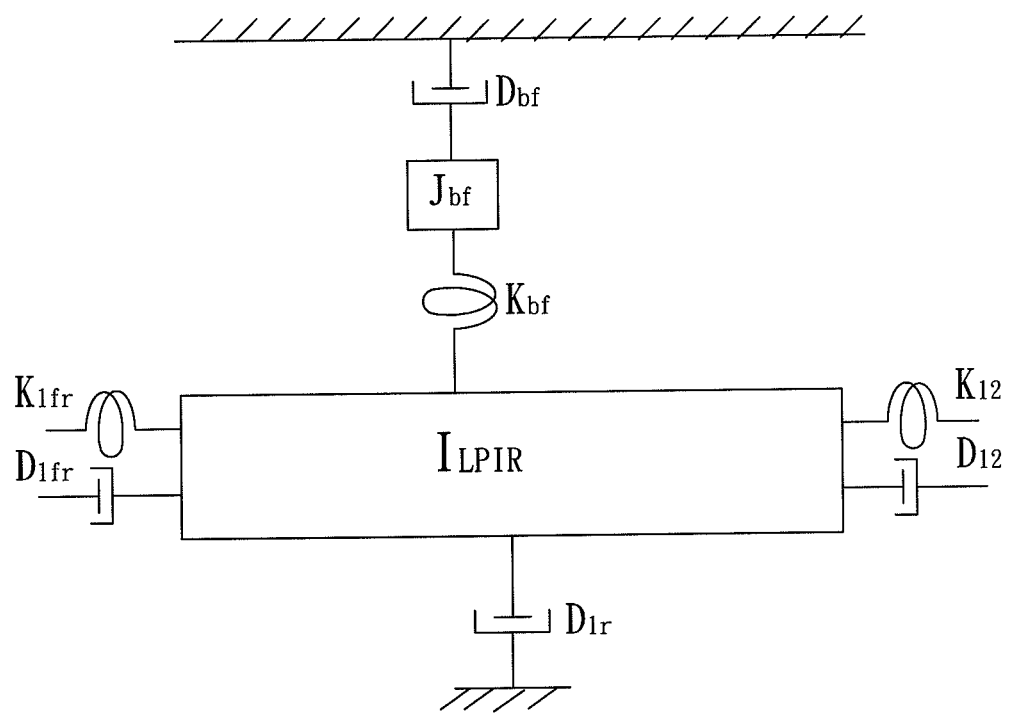
FIG. 6 shows a structure of a fan wheel mechanistic model of the analysis method of the preferred embodiment of the invention.

Referring to FIG. 6, the fan wheel mechanistic model is also presented in a mass-damping-spring form. For convenient illustration, only the mechanistic model of one stage of the fan wheel with 11 stages in the rear part of the first stage low pressure turbine "LP1R" is shown. In detail, for example, in addition to the mass element "$I_{LP1R}$," the spring elements "$K_{1f}$," "$K_{12}$," and the Damper elements "$D_{1r}$," "$D_{1f}$," "$D_{12}$" shown in FIG. 6, a flexibility element "$J_{bf}$" representing the flexibility factor of the single stage of the fan wheel, a flexural spring element "$K_{bf}$" representing the flexural rigidity factor thereof, and a flexural damper element "$D_{bf}$" representing the flexural damping factor thereof are used. There are three kinds of vibration modes of a fan wheel since the fan wheel is a flexible device and can be affected by flexural deformation, cold shrink, and dynamic coupling effect. The said three modes are flexural mode, axial mode and torsional mode, wherein the flexural mode occurs in radial directions of the fan wheel with low frequency and large vibration, the axial mod occurs in axial directions of the fan wheel, and the torsional mode occurs in peripheral direction of the fan wheel. Besides, torsion of the fan wheel can be represented by torsion equation as the following:

$$p\phi_j = \omega_j \quad (1),$$

$$p\omega_j = [\tau_{int,j} - \tau_{out,j} - (C_j + C_{j-1,j} + C_{j,j+1})\omega_j + C_{j-1,j}*\omega_{j-1} + C_{j,j+1}*\omega_{j+1} - (K_{j-1,j} + K_{j,j+1} + K_{Bj})\phi_j + K_{j-1,j}\phi_{j-1} + K_{j,j+1}\phi_{j+1} + K_{Bj}\phi_{Bj}]/J_j \quad (2),$$

$$p\phi_{Bj} = \omega_{Bj} \quad (3),$$

$$p\omega_{Bj} = (\tau_{int,Bj} - \tau_{out,Bj} + K_{Bj}*\phi_j - K_{Bj}*\phi_{Bj} - C_{Bj}*\omega_{Bj})/J_{Bj} \quad (4).$$

In the above equations, $\phi_j$ and $\omega_j$ respectively represent the angular displacement and angular velocity of a rotor inside a j-th stage fan wheel while the $\phi_{Bj}$ and $\omega_{Bj}$ respectively represent the angular displacement and angular velocity of the j-th stage fan wheel.

Figure 7:
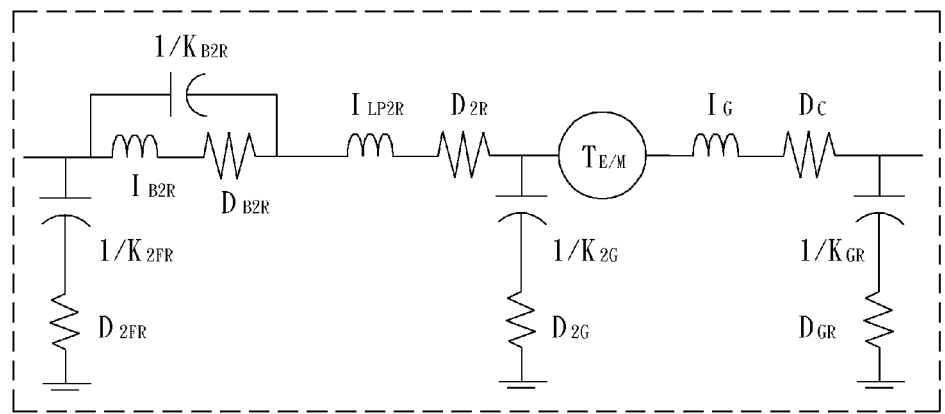
FIG. 7 shows a structure of a turbine-generator electric model of the analysis method of the preferred embodiment of the invention.

Referring to FIG. 7, the inertia-damping-stiffness coefficients for turbine-generator mechanical model is transformed to an inductance-resistance-capacitance network through electromechanical analogy theory. For convenient illustration, only the turbine-generator electric models of the rear part of the second stage low pressure turbine "LP2R" and the generator rotor 121 are shown. In the FIG. 7, capacitances "1/$K_{2FR}$," "1/$K_{2G}$," and "1/$K_{GR}$" respectively represent the rigidity factors between the front part of the second stage low pressure turbine "LP2F" and rear part of the second stage low pressure turbine "LP2R," the rear part of the second stage low pressure turbine "LP2R" and the generator rotor 121, and the generator rotor 121 and the commutator rotor 122. Resistances "$D_{2FR}$," "$D_{2G}$," and "$D_{GR}$" respectively represent the damping factors between the front part of the second stage low pressure turbine "LP2F" and the rear part of the second stage low pressure turbine "LP2R," the rear part of the second stage low pressure turbine "LP2R" and the generator rotor 121, and the generator rotor 121 and the commutator rotor 122. A capacitance "$K_{B2R}$," an inductance "$I_{B2R}$" and a resistance "$D_{B2R}$" respectively represent the rigidity factor, inertia factor and damping factor of the fan wheel "B2R" of the rear part of the second stage low pressure turbine "LP2R." Resistances "$D_G$" and "$D_{2R}$" respectively represent damping factors of the generator rotor 121 and the rear part of the second stage low pressure turbine "LP2R." Inductances "$I_G$" and "$I_{LP2R}$" respectively represent the inertia factors of the generator rotor 121 and the rear part of the second stage low pressure turbine "LP2R." A voltage source "$T_{E/m}$" represents an E/M torque of a rotor.

In this embodiment, a computer system with a simulation software, such as a Matlab-Sim-Power-System, previously installed therein is used to build these models. Specifically, a synchronous machine model of "Fundamental Parameters in propulsion unit" is used to simulate generators of the turbine set 11, a DYg Tri-phase model is used to simulate the first transformer 21 and second transformer 23, a R-L Tri-phase model is used to simulate the three-phase transmission module 22, and a R-L equivalent voltage source model is used to simulate the power network 3.

Figure 8:
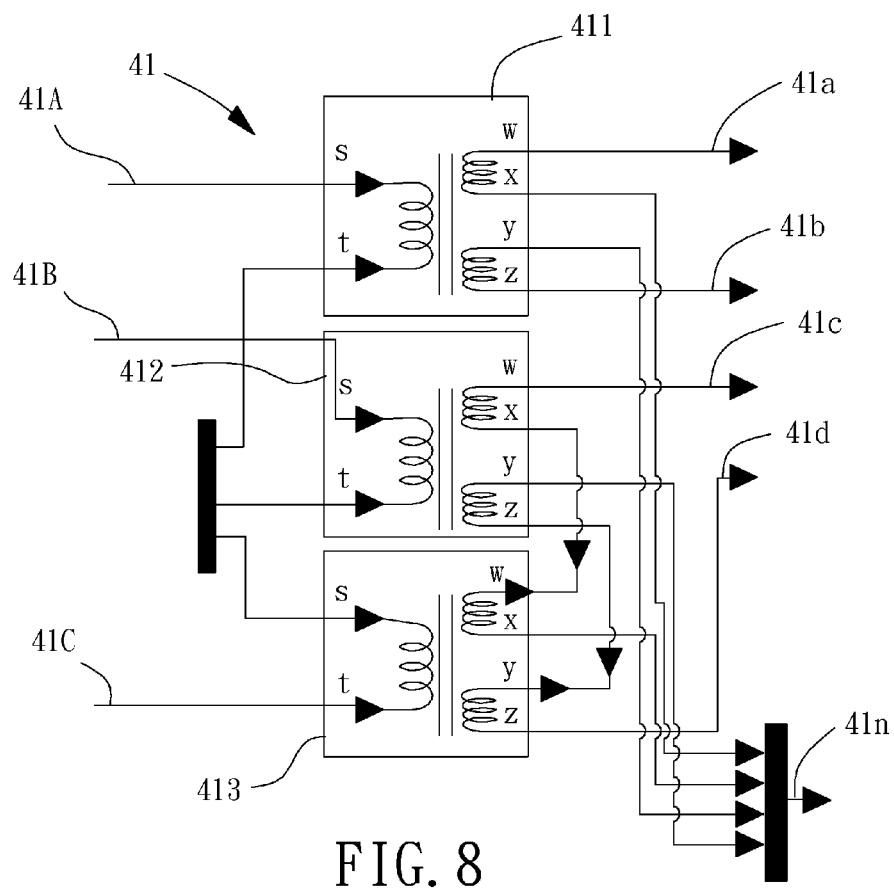
FIG. 8 shows a structure of a Scott-Four-phase model of the analysis method of the preferred embodiment of the invention.

Referring to FIG. 8, a sketch diagram of a Scott-Four-phase model representing the third transformer 41 is shown, with the Scott-Four-phase model has a first input port 41A, a second input port 41B, a third input port 41C, a first transforming unit 411, a second transforming unit 412, a third transforming unit 413, a first output port 41a, a second output port 41b, a third output port 41c, a fourth output port 41d, and a ground end 41n. Each of the first transforming unit 411, second transforming unit 412 and third transforming unit 413 has a primary side providing an "s" input end and a "t" input end and a secondary side providing a "w" output end, an "x" output end, a "y" output end and a "z" output end. Specifically, the "s" input end of the first transforming unit 411 serves as the first input port 41A, the "t" input ends of the first transforming unit 411 and second transforming unit 412 and the "s" input end of the third transforming unit 413 are connected; the "s" input end of the second transforming unit 412 serves as the second input port 41B; the "t" input end of the third transforming unit 413 serves as the third input port 41C. Moreover, the "w" output end of the first transforming unit 411 serves as the first output port 41a; the "x" and "y" output ends of the first transforming unit 411 connect with the ground end 41n; the "z" output ends of the first transforming unit 411 serves as the third output port 41c; the "w" output end of the second transforming unit 412 serves as the second output port 41b; the "x" output end of the second transforming unit 412 connects with the "w" output end of the third transforming unit 413; the "y" output end of the second transforming unit 412 connects with the ground end 41n; the "z" output end of the second transforming unit 412 connects with the "y" output end of the third transforming unit 413; the "x" output end of the third transforming unit 413 connects with the ground end 41n; and the "z" output end of the third transforming unit 413 serves as the fourth output port 41d.

In the analyzing step S3, the first and second system models are analyzed in frequency- and time-domain. Specifically, in frequency domain, when a disturbance occurs in the power transmission system, the disturbance will transfer into an E/M torque comprising an unidirectional component, a system-frequency component, and a double system-frequency component. Therefore, analyses of unidirectional components, system-frequency components, and double system-frequency components of the first and second system models are made, wherein the unidirectional component corresponds to transmission power or current amplitude of the generator 12, the system-frequency component corresponds to a DC component of the current of the generator 12, and the double system-frequency component corresponds to negative sequence current of the generator 12.

In detail, by electromechanical analogy, the mass-damping-spring models of the turbine-generator and fan wheel can be analogized as an inductance-resistance-capacitance network and then sustain a frequency scanning by a phasor analysis, so that mode frequencies and vibration torques in steady state are obtained. In this embodiment, a disturbance is imposed to the generator rotor, and the frequency response of vibration torque with the frequency of the disturbance gradually increased from 0.01 Hz to 140 Hz is obtained, wherein an interval of 0.01 Hz between a prior frequency and a present frequency of the disturbance is preferable. With the frequency response of vibration torque, it is found that all the mode frequencies are out of regions from 95%-105% of integral times of the system frequency in the second system model simulating the combination of the four-phase power transmission system and turbine-generator. Besides, sensitivities of rotor shafts and fan wheels toward the disturbance of the system-frequency component are low.

In time domain, there are 11 kinds of fault situations of the three-phase transmission module 22 while these 11 situations can be categorized into 5 fault types. Similarly, there are 26 kinds of fault situations of the four-phase transmission module 42 while these 26 situations can be categorized into 9 fault types. Referring to the following Table 1, these fault types of the three-phase transmission module 22 and four-phase transmission module 42 are shown, which is illustrated corresponding to the power lines "A," "B" and "C" of the three-phase transmission module 22 and power lines "a," "b," "c" and "d" of the four-phase transmission module 42.

TABLE 1

| Item | Fault line(s) of three-phase transmission module | Fault line(s) of four-phase transmission module |
|---|---|---|
| One line grounded | A | a |
| Two lines grounded | AB | ab, ac |
| Two lines broken | AB | ab, ac |
| Three lines grounded | ABC | abc |
| Three lines broken | ABC | abc |
| Four lines grounded | N/A | abcd |
| Four lines broken | N/A | abcd |

Referring FIGS. 4a and 4b and Table 1, in order to simulate the above-listed situation, each of the fault situations occurs at a 0.1 time point from a start time in midpoints "P1," "P2" of the three-phase transmission module 22 and four-phase transmission module 42, and thus the vibration torques of the fan wheel and the shaft of the turbines 111 are obtained.

According to operation of the circuit breaks "CB" when faults occur, the above fault situations can be mainly classified into a transience type and a lasting type, wherein the circuit breaks "CB" do not operate in the transience type but operate in the lasting type. In the following, for both of the transience type and lasting type, stability analyses, vibration torque analyses of the turbines, and torsional vibration analyses under an identical capacity are discussed.

1.1 Transient Stability Analyses of the Transience Type

The transience type usually includes the three lines grounded situation of the three-phase transmission module 22 and the four lines grounded situation of the four-phase transmission module 42, which are both balanced faults with each line grounded. In transient stability analysis, with each relationship between a restoring time period of the first or second system model and E/M vibration torque, the peat-to-peak torques of the fan wheel of the first and second system model have similar sensitivities, and a worst-case restoring time period can be determined, which is about 0.19 seconds in this embodiment. On the other hand, if both the voltage levels of the first and second system models are 345 kV, the capacity of power transmission lines of the second system model is 163.3% of that of the first system model, which means that the transient stability of the second system is better than that of the first system.

1.2 Vibration Torque Analyses of the Transience Type

In vibration torque analysis of the turbines, the DC component of a phase current of one of the fault lines results in disturbances of the electromagnetic torque of the system-frequency component, wherein the swing of current vibrations is in positive relationship to the unidirectional component of the electromagnetic torque, and the system models are more sensitive to the shaft vibration than to the unidirectional component of the electromagnetic torque. Besides, since there is no negative sequence current in balanced faults of the transience type, the vibration torque of a frequency doubled component of the electromagnetic torque is totally affected by the unidirectional component of the electromagnetic torque. However, no matter how long the restoring time period is, the vibration torque of the second system is lower than that of the first torque; that is, the turbine-generator 1 will be affected by the fault situation in the first system much more than in the second system.

Moreover, regarding to the torsional vibrations of the turbine-generator 1 of the three-phase transmission module 22 and the four-phase transmission module 42, they are the same in a balanced fault due to all lines grounded or broken. Besides, a balanced fault may raise a large shaft vibration torque because shaft vibration is sensitive to the unidirectional component; on the other hand, unbalanced faults may raise fan wheel vibration torques higher than those raised by balanced faults since the blades of a fan wheel is sensitive to negative sequence current. Therefore, an average value of the shaft torque of the second system is smaller than that of the first system, and the fan wheel vibration of the second system is also smaller than that of the first system.

1.3 Torsional Vibration Analyses Under an Identical Capacity

In the worst-case restoring time period of the second system in four lines grounded situation, the impedance of the lines and high-leveled side of the transformers are raised although the voltage level of the lines is lowered. According to the angular responses of the rotors, the transient stability is kept as well as the fault current of the midpoint "P2" is lowered, and thus the electromagnetic torque variation of the generator and torsional vibration of the turbines are also lowered. Referring to the following Table 2, in comparison with those of the first system, the vibrations of the shaft and fan wheel of the second system are additionally suppressed by 19% and 26% respectively.

TABLE 2

| Item | LP1R-LP2F | LP2F-GEN | B2F | B2R |
|---|---|---|---|---|
| First system | 2.94 | 3.92 | 0.19 | 0.186 |
| Second system (345 kV) | 2.84 | 3.53 | 0.154 | 0.164 |
| Second system (211 kV) | 2.43 | 3.10 | 0.134 | 0.143 |

In the lasting type, two step-distance relays are previously set to monitor the a/b phases and the c/d phases. The fault situations of the lasting type can be simulated by the following ways: (1) single line grounded, wherein a single phase of the circuit break "CB" is broken off and then rapidly reconnects; (2) two opposite lines connected or grounded, wherein two phases of the circuit break "CB" monitored by different step-distance relays are broken off and then rapidly reconnect; (3) two adjacent lines connected or grounded, wherein two phases of the circuit break "CB" monitored by a single step-distance relay are broken off without auto-reconnection; (4) three lines connected of grounded, wherein all phases of the circuit break "CB" are broken off without auto-reconnection.

2.1 Transient Stability Analyses of the Lasting Type

Swing of the angular responses of the rotors of the second system is small and transient stability is preferred since the capacity of the second system with voltage level of 345 kV is raised by 66.7%. On the other hand, while the first system and the second system with voltage level of 211 kV have the same power capacity and the impedance of the second system with voltage level of 211 kV is large, a stable rotor angle of the second system, which is 42.5 degrees, is larger than another stable rotor angle of the first system, which is 40.5 degrees.

2.2 Vibration Torque Analyses of the Lasting Type

In the time period of a single phase of the circuit break "CB" from broken off to reconnection, both of the first and second systems are in a fault state with a single line opening, which results in an unbalanced operation and a negative sequence current toward the generator, and thus there is frequency doubled component in the electromagnetic torque of the generator. Furthermore, since the second system has large line impedance, the negative sequence current is large and may make the frequency doubled component obvious.

In sum, with the above analysis method of the present invention, models and analyses are made for ensuring the feasibility and effectiveness of a four-phase power transmission system.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. An analysis method for turbine-generator torsional vibrations affected by power transmission system, which is processed by a computer system with a simulation software, comprising:

building structures of a first system model and a second system model to respectively simulate a first system and a second system;

building detailed models of the first and second system model; and analyzing the detailed models of the first and second system model in frequency- and time-domain, wherein the second system model comprises a turbine-generator, a second power transmission system, and a power network, the turbine-generator has a turbine and a generator driven by the turbine, the second power transmission system has a third transformer, a four-phase transmission module, and a fourth transformer connected in series, and the power network is an infinite bus system, and wherein the third transformer has a first input port, a second input port, a third input port, a first transforming unit, a second transforming unit, a third transforming unit, a first output port, a second output port, a third output port, a fourth output port, and a ground end, each of the first transforming unit, second transforming unit and third transforming unit has a primary side providing an "s" input end and a "t" input end and a secondary side providing a "w" output end an "x" output end, a "y" output end and a "z" output end, the "s" input end of the first transforming unit serves as the first input port, the "t" input ends of the first transforming unit and second transforming unit and the "s" input end of the third transforming unit are connected, the "s" input end of the second transforming unit serves as the second input port, the "t" input end of the third transforming unit serves as the third input port, the "w" output end of the first transforming unit serves as the first output port, the "x" and "y" output ends of the first transforming unit connect with the ground. end, the "z" output ends of the first transforming unit serves as the third output port, the "w" output end of the second transforming unit serves as the second output port, the "x" output end of the second transforming unit connects with the "w" output end of the third transforming unit, the "y" output end of the second transforming unit connects with the ground end, the "z" output end of the second transforming unit connects with the "y" output end of the third transforming unit, the "x" output end of the third transforming unit connects with the ground end, and the "z" output end of the third transforming unit serves as the fourth output port.

2. The analysis method for turbine-generator torsional vibrations affected by power transmission system as claimed in claim 1, wherein the first system model has a three-phase transmission module.

3. The analysis method for turbine-generator torsional vibrations affected by power transmission system as claimed in claim 1, wherein the first system model comprises a turbine-generator, a first power transmission system, and a power network, the turbine-generator has a turbine and a generator driven by the turbine, the first power transmission system has a first transformer, a three-phase transmission module, and a second transformer connected in series, and the power network is an infinite bus system.

4. The analysis method for turbine-generator torsional vibrations affected by power transmission system as claimed in claim 3, wherein the first transformer is a Delta-Wye-Ground transformer, the three-phase transmission module is a single-circuit three-phase line system, and the second transformer is a Wye-Ground-Delta transformer.

5. The analysis method for turbine-generator torsional vibrations affected by power transmission system as claimed in claim 1, wherein the third transformer is a Scott-+-Ground transformer, the four-phase transmission module is a single-circuit four-phase line system, the second transformer is a +-Ground-Scott transformer.

6. The analysis method for turbine-generator torsional vibrations affected by power transmission system as claimed in claim 1, wherein the detailed models of each of the first and second system models comprise a turbine-generator mechanistic model, a fan wheel mechanistic model, a turbine-generator electric model, and a transformer model.

7. The analysis method for turbine-generator torsional vibrations affected by power transmission system as claimed in claim 6, wherein the turbine-generator mechanistic model comprises models of a turbine set and a generator, the turbine set is represented by a high pressure turbine, a front part of a first stage low pressure turbine, a rear part of the first stage low pressure turbine, a front part of a second stage low pressure turbine and a rear part of the second stage low pressure turbine, each of the front and rear parts of the first and second stage low pressure turbines has a fan wheel set with 11 stages, and the generator including a generator rotor, a commutator rotor, and an exciting rotor.

* * * * *